United States Patent
Robl et al.

(10) Patent No.: US 8,986,444 B2
(45) Date of Patent: Mar. 24, 2015

(54) HYBRID CEMENT CLINKER AND CEMENT MADE FROM THAT CLINKER

(71) Applicant: University of Kentucky Research Foundation, Lexington, KY (US)

(72) Inventors: Thomas Robl, Sadieville, KY (US); Tristana Duvallet, Lexington, KY (US); Robert Rathbone, San Antonio, TX (US); Yongmin Zhou, Nanjing (CN)

(73) Assignee: University of Kentucky Research Foundation, Lexington, KY (US)

( * ) Notice: Subject to any disclaimer, the term of this patent is extended or adjusted under 35 U.S.C. 154(b) by 0 days.

(21) Appl. No.: 14/180,619

(22) Filed: Feb. 14, 2014

(65) Prior Publication Data

US 2014/0311386 A1    Oct. 23, 2014

Related U.S. Application Data

(60) Provisional application No. 61/814,854, filed on Apr. 23, 2013.

(51) Int. Cl.
| | |
|---|---|
| C04B 7/32 | (2006.01) |
| C04B 7/36 | (2006.01) |
| C04B 9/11 | (2006.01) |
| C04B 11/28 | (2006.01) |
| C04B 28/06 | (2006.01) |
| C04B 18/18 | (2006.01) |
| C04B 14/00 | (2006.01) |
| C04B 18/06 | (2006.01) |
| C04B 5/00 | (2006.01) |
| C04B 7/14 | (2006.01) |
| C04B 28/08 | (2006.01) |

(52) U.S. Cl.
CPC .................................... C04B 7/323 (2013.01)
USPC ............ 106/693; 106/697; 106/705; 106/789

(58) Field of Classification Search
CPC ................................. C04B 7/32; C04B 28/06
USPC ................... 106/693, 705, 789, 697
See application file for complete search history.

(56) References Cited

U.S. PATENT DOCUMENTS

| | | | |
|---|---|---|---|
| 3,860,433 A | 1/1975 | Ost et al. | |
| 4,286,991 A | 9/1981 | Galer et al. | |
| 4,286,992 A | 9/1981 | Galer et al. | |
| 4,377,977 A | 3/1983 | Wurster | |
| 4,404,031 A | 9/1983 | Sudoh et al. | |
| 4,933,013 A | 6/1990 | Sakai et al. | |
| 4,943,323 A * | 7/1990 | Gartner et al. | 106/808 |
| 5,234,497 A | 8/1993 | Crocker | |
| 5,328,507 A | 7/1994 | Crocker | |
| 5,356,472 A | 10/1994 | Odler | |
| 5,741,357 A | 4/1998 | Sheikh | |
| 6,149,724 A | 11/2000 | Ulibarri et al. | |
| 6,447,597 B1 | 9/2002 | Repette et al. | |
| 6,537,365 B2 | 3/2003 | Ikabata et al. | |
| 6,695,910 B2 | 2/2004 | Classen et al. | |
| 6,818,057 B2 | 11/2004 | Hanley et al. | |
| 7,326,478 B2 | 2/2008 | Bouscal et al. | |
| 7,850,776 B2 | 12/2010 | Gartner et al. | |
| 2003/0183131 A1 | 10/2003 | Classen et al. | |
| 2003/0233961 A1 | 12/2003 | Hanley et al. | |
| 2006/0178453 A1 | 8/2006 | Bohler | |
| 2008/0178769 A1 | 7/2008 | Goodwin et al. | |
| 2010/0132590 A1 | 6/2010 | Gartner et al. | |
| 2011/0297047 A1 * | 12/2011 | Rice et al. | 106/643 |
| 2013/0152825 A1 * | 6/2013 | Ramirez Tovias et al. | 106/693 |

FOREIGN PATENT DOCUMENTS

WO    WO 2011158105 A1 * 12/2011

OTHER PUBLICATIONS

S. Giminez-Molina, et al.; "Phase relations in the system Ca2SiO4-CaO-CaSO4-CaF2 relevant to cement clinkering"; Advances in Cement Research, 1991/92, vol. 4, No. 14, pp. 81-86.

* cited by examiner

Primary Examiner — Kaj K Olsen
Assistant Examiner — Karam Hijji
(74) Attorney, Agent, or Firm — King & Schickli, PLLC

(57) ABSTRACT

A hybrid cement clinker incorporates specific ranges of clinker phases and falls within specific modulus values as set forth and described in this document.

13 Claims, No Drawings

HYBRID CEMENT CLINKER AND CEMENT MADE FROM THAT CLINKER

This utility patent application claims the benefit of priority in U.S. Provisional Patent Application Ser. No. 61/814,854 filed on Apr. 23, 2013, the entirety of the disclosure of which is incorporated herein by reference.

TECHNICAL FIELD

This document relates generally to the field of cement clinkers and cement.

BACKGROUND

Cement is a very important construction material and world production has exceeded over 3 billion tons per year in recent years. In order to save resources and protect the environment, it is important to reduce the consumption of raw materials and reduce the energy used in cement production.

This document relates to a new and improved hybrid cement clinker and cement that utilizes waste and byproducts of other industrial processes while providing enhanced performance and environmental characteristics. The hybrid cement clinker and cement incorporate the best aspects of ordinary Portland cement and calcium sulfoaluminate cement. The new and improved hybrid cement is a ferrite-alite-calcium sulfoaluminate (CSA) cement that is less expensive to produce than conventional CSA cements and is much more energy efficient than ordinary Portland cement (OPC) with greatly reduced carbon emissions and similar performance.

SUMMARY

In accordance with the purposes and benefits described herein, a hybrid cement clinker is provided. The hybrid cement clinker includes the following clinker phases: about 20-55 weight percent $C_3S$, about 5-25 weight percent $C_2S$, about 10-20 weight percent $C_4A_3\bar{S}$, about 5-50 weight percent $C_4AF$, about 3-7 weight percent $C\bar{S}$, and about 0.5-1.0 weight percent $CaF_2$. The clinker further has a lime adequate degree (LAD) modulus value of between about 0.8 and about 0.96, a ratio of silicates and aluminates (RSA) modulus value of between about 0.3 and about 4.0, a ratio of sulfoaluminates and ferroaluminates (RSF) modulus value of between about 0.2 and about 4.0, a sulfur excessive coefficient (SEC) modulus value of between about 0.4 and about 2.3 and a quantity of liquid phase (QLP) modulus value of between about 0.08 and about 0.12.

More specifically describing the cement clinker, the clinker has a LAD modulus value of between 0.86 and about 0.94, a RSA modulus value of between 0.5 and about 2.5, a RSF modulus value of between 0.3 and about 1.5, a SEC modulus value of between about 1.0 and about 1.7 and a QLP modulus value of between about 0.09 and about 0.11.

The cement clinker may incorporate a waste material selected from a group consisting of stainless steel pickling sludge, Bayer red mud, fluidized bed combustion spent bed material, air cooler blast furnace slag, iron casting slag, carbide lime, aluminum dross and mixtures thereof. Further the clinker may include between 0.05 and 1.0 weight percent of triisopropanolamine (TIPA).

In one particularly useful embodiment the clinker is substantially free of $C_3A$. In one particularly useful embodiment the cement clinker further includes between 675-725 kg of limestone per ton of clinker. In one particularly useful embodiment the cement clinker comprises about 35-41 weight percent $C_3S$, about 10-15 weight percent $C_2S$, about 14-16 weight percent $C_4A_3\bar{S}$, about 20-26 weight percent $C_4AF$ and about 4-6 weight percent $C\bar{S}$, and about 0.7-0.85 weight percent $CaF_2$ fired at a temperature of about 1250-1300° C. In one particularly useful embodiment that clinker has a LAD modulus value of between about 0.88 and about 0.92, a RSA modulus value of between about 1.0 and about 1.7, a RSF modulus value of between about 0.5 and about 0.8, a SEC modulus value of between about 1.0 and about 1.6 and a QLP modulus value of between about 0.095 and about 0.105.

These and other embodiments will be set forth in the description which follows, and in part will become apparent to those of ordinary skill in the art by reference to the following description.

DETAILED DESCRIPTION

Disclosed herein is a ferrite-alite-calcium sulfoaluminate cement or F/A-CSA that is very high in ferrite ($C_4AF$) at concentrations of up to 50% by weight, that also contains high contents of both Klein's compound ($C_4A_3\bar{S}$) and Alite ($C_3S$). This cement will be less expensive to produce than conventional CSA cements, and be much more energy efficient than ordinary Portland cement (OPC) with greatly reduced carbon emissions and similar performance.

The presence of both Klein's compound (the calcium sulfoaluminate in CSA) and alite is unusual, as these two materials are generally considered thermally incompatible, alite not typically forming below 1300° C. and Klein's compound beginning to decompose at 1300° C.-1350° C.

This cement was fabricated with the help of $CaF_2$ which is both a known flux and mineralizing agent for alite. In this system it forms the compound fluorellestadite ($Ca_{10}(SiO_4)_3(SO_4)_3F_2$) which has a melting temperature of 1245° C. forming a flux. It has been found that in the presence of fluorellestadite the melting temperature of ferrite decreases from about 1368° C. to 1269° C. and the melting point of fluorellestadite decreases to as low as 1204° C. The presence of a low temperature liquid phase accelerates the reaction of $C_2S$ (belite) with C (lime) to form $C_3S$. In a totally dry system this solid-solid reaction is extremely slow.

The use of the flux has allowed the definition of a reasonable thermal regime where Klein's compound, and alite along with belite and high levels of ferrite can co-exist (1250° C. to 1275° C. and 30 to 60 minutes of retention time). The compositions of cement produced in this regime have very low levels of free lime, indicating that it is fully reacted and very low levels of $C_3A$, a thermal decomposition product of Klein's compound, indicating that it is not over-fired.

Triisopropanolamine (TIPA) further helps the ferrite to fully hydrate relatively quickly. Typically ferrite is not considered to contribute significantly to the strength of OPC products due to its very slow rate of hydration. TIPA is most likely acting as a chelating agent with the iron keeping it from forming iron oxy-hydroxides which can form coatings and stop the hydration process.

Also with TIPA and sufficient levels of gypsum (>10% by weight), we find that there is no interference with the silicate hydration and C—S—H gel formation, which is also very important, as in conventional CSA systems the silicates do not contribute much to strength, at least early strength. The silicates in typical CSA are mostly in the form of $C_2S$ (belite) which also hydrates slowly. In our activated F/A-CSA formulation, ferrite is a former of ettringite, the principal cement forming product of CSA.

The F/A-CSA cement reduces the amount of bauxite needed for fabrication of CSA by more than ⅔, greatly reducing its cost. Further, the iron-rich formulation also enables the use of large quantities of red mud, an abundant and potentially dangerous industrial waste, reducing cost and greatly enhancing its benefit. Other industrial waste products such as stainless steel pickling sludge, which is high in iron and $CaF_2$, and fluidized bed combustion waste, high in calcium and sulfate, can be utilized as demonstrated. In addition, the use of industrial by-products, calcium sulfate, and the bauxite greatly lowers the limestone content of the F/A-CSA cement formulation resulting in lower $CO_2$-emission from mineral calcination. Advantageously, the use of fluxes and mineralizers, $CaF_2$ and $CaSO_4$, allows F/A-CSA to be produced at very low firing temperature—1250° C.-1275° C., 150° C. to 200° C. lower than OPC, making this cement energy efficient and further lowering the carbon emissions. Further, the cement is also activated with gypsum or anhydrite which is added at a rate of 10% to 30% (depending on ferrite content) to the F/A-CSA cement, further reducing carbon emissions. Typically, the clinker formulation includes between about 0.5 and about 1.0 weight percent $CaF_2$. More preferably, the clinker formulation typically includes between about 0.7 and about 0.85 weight percent $CaF_2$.

The F/A-CSA cement has a high concentration of alite which is the most reactive component in OPC. If the cement is properly sulfated, the alite component fully hydrates to C—S—H gels greatly contributing to the strength and stability of the cement and its mortar or concrete products. The belite contained in many CSA cements is found to hydrate very slowly if at all contributing little to the strength.

The F/A-CSA cement also has a high content of Klein's compound which is the principle cementitious agent for CSA cements producing the high early strength characteristics of CSA. Advantageously, the use of alcohol amines (more specifically TIPA), at a rate of 0.05-1.0% by weight of cement (i.e. clinker+gypsum), results in the full hydration of the ferrite in the F/A-CSA cement and subsequent ettringite formation, also greatly contributing to its stability. Still further, the combination of alite, Klein's compound and active ferrite results in a high performance cement that is comparable to OPC and conventional CSA cements.

Definitions

A. Clinker Phases
1. $C_3S$—alite, tricalcium silicate, $3CaO.SiO_2$
2. $C_2S$—belite, main constituent is dicalcium silicate, $2CaO.SiO_2$
3. $C_4A_3\bar{S}$—Klein's compound, calciumsulfoaluminate, $Ca_4(AlO_2)_6SO_4$
4. $C_4AF$—ferrite or tetracalcium aluminoferrite, $4CaO.Al_2O_3.Fe_2O_3$
5. $C_3A$—tricalciumaluminate, $3CaO.Al_2O_3$ B. Modulus Values
1. Designing of Representative Controlled Modulus Values for FA-CSA Cement Clinkers—As more modulus values are needed for designing the FA-CSA cement, it is more difficult to calculate the proportions of raw materials of FA-CSA cements than that of Portland cements. The modulus values are similar to that of the Portland cement with but have to be modified. For example, because the phases $C_3S$ and $C_2S$ exist in the FA-CSA cement clinker simultaneously, the Lime Saturation Factor is adopted to evaluate the possible degree of conversion from $C_2S$ to $C_3S$. Due to the different chemical and mineral compositions, the formula of Lime Saturation Factor for FA-CSA cement will be different from that of Portland cement. To distinguish them, the symbol of Lime Saturation Factor for FA-CSA cement can referred to as LAD (Lime Adequate Degree). LAD can be definite as the ratio between the rest CaO after being absorbed by $C_4AF$ and $C_4A_3\bar{S}$ and the CaO needed by $C_3S$ if all $SiO_2$ is converted to $C_3S$.

The second modulus value adopted for FA-CSA cement clinker is RSA (Ratio of Silicates and Aluminates), which is similar to the SM for Portland cement. But RSA is definite as ratio of silicates and aluminates of FA-CSA cement directly.

The third modulus value RSF (Ratio of Sulfoaluminate and Ferroaluminate) is adopted to describe the ratio between $C_4A_3\bar{S}$ and $C_4AF$.

The fourth modulus value is SEC (Sulfur Excessive Coefficient). The modulus SEC is defined as the specific value between the remaining quantity of $SO_3$ in the clinker deducting the quantity of $SO_3$ corresponding to the quantity of $CaSO_4$ needed for the formation of liquid phase in the clinker and the quantity of $SO_3$ requested for forming the mineral phase $C_4A_3\bar{S}$ completely. Usually, in order to form sufficiently, the practical quantity of $SO_3$ is larger than needed in FA-CSA clinker, i.e. SEC is greater than 1.00, which is why we named it as SEC.

The fifth and last modulus value is QLP (Quantity of Liquid Phase). The definition of QLP is the percentage of liquid phase in the clinkers.

2. Assumptions in the Calculation of Modulus Values
a) The principal mineral phases in the FA-CSA cement clinkers are $C_3S$, $C_2S$, $C_4A_3\bar{S}$, $C_4AF$ and $CaSO_4$ while minor mineral phases are neglected;
b) All $Fe_2O_3$ of the raw meal will form the mineral phase $C_4AF$ completely with the consumption of corresponding $Al_2O_3$ and CaO;
c) The remaining $Al_2O_3$ in the raw meal will form $C_4A_3\bar{S}$ completely, and the corresponding CaO and $SO_3$ will be consumed;
d) All the silicon dioxide ($SiO_2$) of the raw meal forms $C_2S$. The remaining lime (CaO) reacts with $C_2S$ to form $C_3S$.
e) The main liquid phase for the formation of mineral phases in FA-CSA cement clinker is fluorellestadite ($3C2S.3CaSO_4.CaF_2$). The Quantity of Liquid Phase (QLP) depends on the percentage of $CaF_2$ and $CaSO_4$ added into the raw meal.

3. Equations for Calculating the Modulus Value—As mentioned above, the main mineral phases in FA-CSA cement are $C_3S$, $C_2S$, $C_4A_3\bar{S}$ and $C_4AF$. Usually a little bit surplus of CaO and $CaSO_4$ is provided to ensure that $C_4A_3\bar{S}$ and $C_3S$ can be formed sufficiently. Therefore phases $CaSO_4$ and $f_{CaO}$ can exist in the clinker. All phases in FA-CSA clinker and the percentages of oxides for them are shown in table 1.

TABLE 1

Percentages of oxides in main mineral phases of FA-CSA clinker

| Oxides | Percentages of Oxides in mineral phases/% | | | | | |
|---|---|---|---|---|---|---|
| | $C_3S$ | $C_2S$ | $C_4A_3\bar{S}$ | $C_4AF$ | $CaSO_4$ | $f_{CaO}$ |
| CaO | 73.6838 | 65.1158 | 36.7565 | 46.1577 | 41.1905 | 100 |
| $SiO_2$ | 26.3162 | 34.8842 | | | | |
| $Al_2O_3$ | | | 50.1237 | 20.9813 | | |
| $Fe_2O_3$ | | | | 32.8610 | | |
| $SO_3$ | | | 13.1197 | | 58.8095 | |

4. Calculation of LAD—Assuming $Fe_2O_3$ is absorbed to form $C_4AF$ completely, the corresponding consumption of $Al_2O_3$ is $0.6385Fe_2O_3$, where $0.6385=20.9813/32.8610$. The rest of $Al_2O_3$ that can be absorbed in $C_4A_3\bar{S}$ will be $Al_2O_3 - 0.6385Fe_2O_3$. In the same time, the corresponding $SO_3$ will be consumed as $0.2618(Al_2O_3-0.6385Fe_2O_3)$. The rest $SO_3$ existed in $CaSO_4$ is $SO_3-0.2618(Al_2O_3-0.6385Fe_2O_3)$, the corresponding CaO of $CaSO_4$ is:

$$0.7004[SO_3-0.2618(Al_2O_3-0.6385Fe_2O_3)]$$

Where:

$$0.7004=41.1905/58.8095$$

The consumption of CaO by $C_4AF$ is:

$$1.4046Fe_2O_3$$

Where:

$$1.4046=46.1577/32.8610$$

The consumption of CaO by $C_4A_3\bar{S}$ is:

$$0.7333(Al_2O_3-0.6385Fe_2O_3)$$

Where:

$$0.7333=36.7565/50.1237$$

Therefore the total CaO that can be absorbed by $SiO_2$ is:

$$(CaO-f_{CaO})-0.7004[SO_3-0.2618(Al_2O_3-0.6385Fe_2O_3)]-1.4046Fe_2O_3-0.7333(Al_2O_3-0.6385Fe_2O_3)=(CaO-f_{CaO})-0.5499Al_2O_3-1.0534Fe_2O_3-0.7004SO_3$$

According to the definition of LAD, the equation for LAD will be:

$$LAD = \frac{(CaO - f_{CaO}) - 0.5499\,Al_2O_3 - 1.0534\,Fe_2O_3 - 0.7004\,SO_3}{2.7999\,SiO_2}$$

Where:

$$2.7999=73.6838/26.3162$$

It is the mass ratio of calcium oxide and silicon dioxide when all $SiO_2$ convert into C3S.

5. Deduction of RSA—According to table 1, the relationships between chemical compositions and mineral compositions of clinker can be obtained as the following linear equations:

$$\begin{cases} CaO = 0.7368C_3S + 0.6512C_2S + 0.3676C_4A_3\bar{S} + \\ \qquad\quad 0.4616C_4AF + 0.4119CaSO_4 + f_{CaO} \\ SiO_2 = 0.2632C_3S + 0.3488C_2S \\ Al_2O_3 = 0.5012C_4A_3\bar{S} + 0.2098C_4AF \\ Fe_2O_3 = 0.3286C_4AF \\ SO_3 = 0.1312C_4A_3\bar{S} + 0.5881CaSO_4 \end{cases} \quad (4\text{-}15)$$

The mineral compositions of the FA-CSA clinker can be calculated as follow by solving the equations above.

$$\begin{cases} C_3S = 4.0715(CaO - f_{CaO}) - 7.5999SiO_2 - \\ \qquad\quad 2.2393Al_2O_3 - 4.2892Fe_2O_3 - 2.8517SO_3 \\ C_2S = 8.5999SiO_2 + 1.6893Al_2O_3 + \\ \qquad\quad 3.2357Fe_2O_3 + 2.1513SO_3 - 3.0715(CaO - f_{CaO}) \\ C_4A_3\bar{S} = 1.9951Al_2O_3 - 1.2738Fe_2O_3 \\ C_4AF = 3.0431Fe_2O_3 \\ CaSO_4 = 1.7004SO_3 - 0.4451Al_2O_3 + 0.2842Fe_2O_3 \end{cases}$$

As the definition described above, RSA can be expressed as follow:

$$RSA = \frac{C_3S + C_2S}{C_4A_3\bar{S} + C_4AF}$$

i.e.

$$RSA = \frac{(CaO - f_{CaO}) + SiO_2 - 0.5500Al_2O_3 - 1.0535Fe_2O_3 - 0.7004SO_3}{1.9951Al_2O_3 + 1.7693Fe_2O_3}$$

6. Deduction of RSF—As the definition of RSF described above, RSF can be expressed as follows:

$$RSF = \frac{C_4A_3\bar{S}}{C_4AF}$$

Thus:

$$RSF = 0.6556\frac{Al_2O_3}{Fe_2O_3} - 0.4186$$

7. Deduction of SEC—As the $Al_2O_3$ needed in $C_4AF$ is $0.6385Fe_2O_3$, the rest $Al_2O_3$ will be $Al_2O_3-0.6385Fe_2O_3$ which can be absorbed by $C_4A_3\bar{S}$, thus formula of SEC is as follows:

$$SEC = \frac{SO_3 - 3.0766CaF_2}{0.2617Al_2O_3 - 0.1671Fe_2O_3}$$

Where: $CaF_2$ is the percentage of $CaF_2$ in the clinker. It can be decided by the QLP.

8. Deduction of QLP—Because the $SO_3$ in the clinker is designed enough and the liquid phase can be formed at the lower temperature, the QLP will depend on the quantity of $CaF_2$ in the clinker. Thus, $$QLF = \frac{M_L}{M_{CaF_2}} \times CaF_2 = 12.8494 CaF_2$$

Where:

$M_L$ is molecular weight of liquid phase.

9. The Relationship between Modulus Values and Mineral Compositions There are two ways to calculate the mineral compositions of FA-CSA clinker. The first one is to calculate by using chemical compositions of clinker; and the second one is to calculate according to the modulus value. The mineral compositions calculated by chemical compositions are shown in the equations above. The mineral compositions calculated by modulus values can be deduced as follows:
The LAD value also can be described as follow when the mineral compositions are used:

$$LAD = \frac{C_3S + 0.8835C_2S}{C_3S + 1.3253C_2S}$$

The modulus value SEC can also be written as:

$$SEC = \frac{0.1312C_4A_3\bar{S} + 0.5881(CaSO_4 - 5.2315CaF_2)}{0.2617(0.5012C_4A_3\bar{S} + 0.2098C_4AF) - 0.1671 \times 0.3286C_4AF}$$

It can be simplified as follow:

$$SEC = 1 + 4.4825 \times \frac{CaSO_4 - 5.2315CaF_2}{C_4A_3\bar{S}}$$

The RSA and RSF are shown as follows respectively according to their definitions.

$$RSA = \frac{C_3S + C_2S}{C_4A_3\bar{S} + C_4AF}$$

$$RSF = \frac{C_4A_3\bar{S}}{C_4AF}$$

Because $C_4AF=3.0431Fe_2O_3$, the percentages of other mineral phases can be calculated easily. The detailed results will be omitted.

10. Definition of a Range of Useful Modulus Values—The free lime content is a measure of the extent in which the raw materials have reacted to form clinker phases. Free lime contents above about 2% are generally not acceptable and a target of less than 1% was used here. The free lime contents measured on each clinker fired at 1300° C. for 30 minutes are displayed in table 2 below. The free lime content is correlated to the modulus values, and optimum/range values can be drawn from all these experiments.

The following matrix of tests were run:

LAD=0.88, 0.90, 0.92, 0.94 when RSA=3.00, RSF=2.00, SEC=1.40 and QLP=0.10;

RSA=0.50, 1.00, 2.00, 3.00, 4.00, ∞(9967) when LAD=0.92, RSF=2.00, SEC=1.40, QLP=0.10;

RSF=0.50, 1.00, 2.00, 4.00 when LAD=0.92, RSA=3.00, SEC=1.40, QLP=0.10;

SEC=1.00, 1.20, 1.40, 1.60 when LAD=0.92, RSA=3.00, RSF=2.00, QLP=0.10;

QLP=0.06, 0.08, 0.10, 0.12 when LAD=0.92, RSA=3.00, RSF=2.00, SEC=1.40.

TABLE 2

Clinker, Modulus and Corresponding Free Lime Content

| Samples | Clinker Compositions | | | | | Modulus Values | | | | | F. Lime |
|---|---|---|---|---|---|---|---|---|---|---|---|
| | $C_3S$ | $C_2S$ | $C_4A_3\bar{S}$ | $C_4AF$ | $C\acute{S}$ | LAD | RSA | RSF | SEC | QLP | 1300° C. |
| SC-01 | 49.56 | 20.96 | 15.63 | 7.81 | 5.46 | 0.88 | 3.00 | 2.00 | 1.40 | 0.10 | 0.64 |
| SC-02 | 53.33 | 17.18 | 15.63 | 7.81 | 5.46 | 0.90 | 3.00 | 2.00 | 1.40 | 0.10 | 0.70 |
| SC-03 | 56.97 | 13.54 | 15.63 | 7.81 | 5.47 | 0.92 | 3.00 | 2.00 | 1.40 | 0.10 | 0.85 |
| SC-04 | 60.51 | 10.01 | 15.63 | 7.81 | 5.47 | 0.94 | 3.00 | 2.00 | 1.40 | 0.10 | 0.92 |
| SC-05 | 24.99 | 5.89 | 40.68 | 20.34 | 7.70 | 0.92 | 0.50 | 2.00 | 1.40 | 0.10 | 1.82 |
| SC-06 | 37.59 | 8.91 | 30.80 | 15.40 | 6.82 | 0.92 | 1.00 | 2.00 | 1.40 | 0.10 | 1.23 |
| SC-07 | 50.45 | 11.98 | 20.74 | 10.37 | 5.92 | 0.92 | 2.00 | 2.00 | 1.40 | 0.10 | 0.79 |
| SC-03 | 56.97 | 13.54 | 15.63 | 7.81 | 5.47 | 0.92 | 3.00 | 2.00 | 1.40 | 0.10 | 0.85 |
| SC-08 | 60.92 | 14.48 | 12.54 | 6.27 | 5.19 | 0.92 | 4.00 | 2.00 | 1.40 | 0.10 | 0.78 |
| SC-09 | 76.92 | 18.31 | 0.01 | 0.00 | 4.07 | 0.92 | ∞9967 | 1.91 | 1.18 | 0.10 | 0.96 |
| SC-10 | 57.35 | 13.63 | 7.87 | 15.74 | 4.77 | 0.92 | 3.00 | 0.50 | 1.40 | 0.10 | 0.42 |
| SC-11 | 57.16 | 13.59 | 11.76 | 11.76 | 5.12 | 0.92 | 3.00 | 1.00 | 1.40 | 0.10 | 0.61 |
| SC-03 | 56.97 | 13.54 | 15.63 | 7.81 | 5.47 | 0.92 | 3.00 | 2.00 | 1.40 | 0.10 | 0.85 |
| SC-12 | 56.83 | 13.50 | 18.70 | 4.67 | 5.74 | 0.92 | 3.00 | 4.00 | 1.40 | 0.10 | 0.98 |
| SC-13 | 57.79 | 13.74 | 15.86 | 7.93 | 4.07 | 0.92 | 3.00 | 2.00 | 1.00 | 0.10 | 0.43 |
| SC-14 | 57.38 | 13.64 | 15.74 | 7.87 | 4.77 | 0.92 | 3.00 | 2.00 | 1.20 | 0.10 | 0.79 |
| SC-03 | 56.97 | 13.54 | 15.63 | 7.81 | 5.47 | 0.92 | 3.00 | 2.00 | 1.40 | 0.10 | 0.85 |
| SC-15 | 56.58 | 13.44 | 15.51 | 7.76 | 6.15 | 0.92 | 3.00 | 2.00 | 1.60 | 0.10 | 0.97 |
| SC-16 | 58.10 | 13.82 | 15.95 | 7.97 | 3.86 | 0.92 | 3.00 | 2.00 | 1.40 | 0.06 | 1.53 |
| SC-17 | 57.54 | 13.67 | 15.79 | 7.89 | 4.66 | 0.92 | 3.00 | 2.00 | 1.40 | 0.08 | 1.16 |
| SC-03 | 56.97 | 13.54 | 15.63 | 7.81 | 5.47 | 0.92 | 3.00 | 2.00 | 1.40 | 0.10 | 0.85 |
| SC-18 | 56.42 | 13.39 | 15.47 | 7.73 | 6.26 | 0.92 | 3.00 | 2.00 | 1.40 | 0.12 | 0.61 |

Low free lime content are obtained with these modulus values:

Low LAD value range from 0.88 to 0.94;
RSA>2;
Low RSF (<2);
SEC low, close to 1.20;
QLP close to 0.10.

Based on the data however the following broader range of modulus values produced good results.

Five compositions were formulated from Reagent Chemicals (RC) as displayed in table 3 below. The ferrite content varied from 5% to 45% by weight from compositions #1 to #5. Some parameters were constant through all these formulations, such as LAD at 0.88, SEC at 1.20 and QLP at 0.10.

TABLE 3

Additional examples of modulus values

| Composition Number | | #1 | #2 | #3 | #4 | #5 |
|---|---|---|---|---|---|---|
| Modulus Values | LAD | | | 0.88 | | |
| | RSA | 3.63 | 2.09 | 1.32 | 0.86 | 0.54 |
| | RSF | 3.01 | 1.00 | 0.60 | 0.43 | 0.33 |
| | SEC | | | 1.20 | | |
| | QLP | | | 0.10 | | |
| Chemical Formulations | $Ca(OH)_2$ | 63.73 | 60.85 | 58.02 | 55.18 | 52.32 |
| | $SiO_2$ | 17.06 | 14.67 | 12.31 | 9.96 | 7.60 |
| | $Al(OH)_3$ | 10.68 | 13.27 | 15.83 | 18.38 | 20.95 |
| | $Fe_2O_3$ | 1.34 | 4.03 | 6.70 | 9.34 | 12.0 |
| | $CaSO_4$ | 6.56 | 6.55 | 6.52 | 6.51 | 6.50 |
| | $CaF_2$ | 0.64 | 0.64 | 0.63 | 0.63 | 0.63 |
| Chemical Compositions | CaO | 61.42 | 58.94 | 56.50 | 54.02 | 51.52 |
| | $SiO_2$ | 20.96 | 18.07 | 15.21 | 12.34 | 9.44 |
| | $Al_2O_3$ | 8.56 | 10.67 | 12.76 | 14.86 | 16.98 |
| | $Fe_2O_3$ | 1.64 | 4.94 | 8.23 | 11.50 | 14.81 |
| | $SO_3$ | 4.76 | 4.76 | 4.78 | 4.76 | 4.77 |
| | $CaF_2$ | | | 0.78-0.79 | | |
| Clinker Composition | $C_3S$ | 50.90 | 43.95 | 36.96 | 30.00 | 22.88 |
| | $C_2S$ | 21.65 | 18.61 | 15.66 | 12.69 | 9.75 |
| | $C_4A_3\bar{S}$ | | | 15 | | |
| | $C_4AF$ | 4.98 | 14.99 | 24.99 | 34.95 | 45.01 |
| | $C\bar{S}$ | | | 4.75 | | |
| Free Lime (wt. %) | 1250° C.-30 min | — | — | — | — | — |
| | 1250° C.-60 min | — | 1.85 | 1.14 | 1.38 | 1.20 |
| | 1275° C.-30 min | — | 1.62 | 1.26 | 0.90 | 1.02 |
| | 1275° C.-60 min | — | 0.72 | 0.60 | 0.54 | 0.66 |
| | 1300° C.-30 min | 1.50 | 0.30 | 0.24 | 0.30 | 0.30 |
| | 1300° C.-60 min | 0.78 | — | — | — | — |
| | 1325° C.-30 min | 1.79 | — | — | — | — |
| | 1325° C.-60 min | 0.60 | — | — | — | — |
| | 1350° C.-30 min | 1.08 | — | — | — | — |

Four compositions were formulated from industrial by-products (BP) as displayed in the table below.

TABLE 4

Modulus Values based on Industrial By Products.

| Composition number | | #1 | #2 | #3 | #4 | #5 |
|---|---|---|---|---|---|---|
| Modulus Values | LAD | 0.88 | 0.92 | 0.92 | 0.91 | 0.91 |
| | RSA | 3.30 | 2.32 | 1.39 | 0.85 | 0.54 |
| | RSF | 2.38 | 1.44 | 0.71 | 0.45 | 0.32 |
| | SEC | 1.20 | 1.53 | 1.57 | 1.63 | 1.71 |
| | QLP | 0.10 | 0.10 | 0.10 | 0.10 | 0.10 |
| Chemical Formulations | Hydrated Lime | 46.3 | 46.3 | 46.3 | 46.3 | 45.8 |
| | Bottom Ash | 15.236 | 18.36 | 18.35 | 18.3 | 18.29 |
| | Red Mud | 0 | 2.55 | 8.7 | 15 | 20.8 |
| | Bauxite | 1 | 4.0 | 7 | 10 | 13 |
| | BF Slag Fines | 24.102 | 17.62 | 10.14 | 3 | 0 |
| | Class C Fly Ash | 12.7 | 10.52 | 8.87 | 6.77 | 1.5 |
| | $CaF_2$ | 0.662 | 0.65 | 0.64 | 0.63 | 0.62 |

TABLE 4-continued

Modulus Values based on Industrial By Products.

| Composition number | | #1 | #2 | #3 | #4 | #5 |
|---|---|---|---|---|---|---|
| Chemical Compositions | CaO | 58.56 | 57.72 | 55.32 | 52.85 | 50.68 |
| | $SiO_2$ | 19.65 | 17.25 | 14.45 | 11.51 | 8.89 |
| | $Al_2O_3$ | 8.57 | 10.16 | 12.29 | 14.46 | 16.29 |
| | $Fe_2O_3$ | 2.01 | 3.59 | 7.15 | 10.93 | 14.37 |
| | $SO_3$ | 4.69 | 5.53 | 5.57 | 5.59 | 5.57 |
| | $CaF_2$ | 0.78 | 0.78 | 0.78 | 0.78 | 0.78 |
| Clinker Composition | $C_3S$ | 47.96 | 50 | 41.36 | 32.54 | 24.75 |
| | $C_2S$ | 20.14 | 11.73 | 10.21 | 8.45 | 6.81 |
| | $C_4A_3\bar{S}$ | 14.54 | 15.70 | 15.41 | 14.94 | 14.20 |
| | $C_4AF$ | 6.11 | 10.91 | 21.77 | 33.25 | 43.73 |
| | $C\bar{S}$ | 4.73 | 5.91 | 6.03 | 6.17 | 6.30 |
| Free Lime (wt. %) | 1250° C.-60 min | 0.72 | 0.66 | 0.72 | 0.48 | 0.78 |

Even though five modulus values were established, actually three of them have to remain constant to produce a clinker expecting to correspond to the theoretical formulations. The two other modulus values do not have a specific values but recommended ranges.

LAD=0.88; SEC=1.20; QLP=0.10; RSA>2; RSF low (close to 0.5)

Others unknowns (three actually) have to be designed, such as the amounts of $C_3S$ (or $C_2S$), $C_4A_3\bar{S}$, $C_4AF$, $C\bar{S}$, RSF, RSA.

When the modulus values are selected, along with the theoretical clinker composition, different industrial by-products can be mixed to obtain the same final clinker composition. Endless formulations can be established, and the use of specific industrial by-products is then of great consideration depending on the clinker composition. This is further illustrated in table 5.

TABLE 5

Modulus values using additional industrial byproducts

| LAD | 0.88 |
|---|---|
| RSA | 1.28 |
| RSF | 0.60 |
| SEC | 1.20 |
| QLP | 0.10 |
| $C_3S$ | 36 |
| $C_2S$ | 14 |
| $C_4A_3\bar{S}$ | 15 |
| $C_4AF$ | 24 |
| $C\bar{S}$ | 5 |

| Formulations # | 1 | 2 | 3 |
|---|---|---|---|
| $CaCO_3$ | 56.6 | 53.5 | 55.16 |
| Fluorite | 0 | 0 | 0.575 |
| FGD Gypsum | 6.72 | 0 | 0 |
| Aluminum Dross | 7.9 | 7.76 | 0 |
| Pickling Sludge | 1.6 | 1.64 | 0 |
| Spurlock Bottom Ash | 0 | 13.85 | 13.715 |
| Red Mud | 10.4 | 9.9 | 9.25 |
| Bauxite | 0 | 0 | 5.7 |
| Tell City Slag | 16.78 | 13.35 | 0 |
| Coshocton Slag | 0 | 0 | 5.3 |
| Deely Class C Fly Ash | 0 | 0 | 10.3 |
| TOTAL | 100 | 100 | 100 |

Several compositions defined by their modulus values were tested in order to define the optimum modulus values for each composition. A wide range of modulus values was tested, corresponding consequently to a wide range of A/CSA cements clinkers (high ferrite, high CSA, no ferrite/CSA).

C. Additives and other Constituents
1. TIPA—triisopropanolamine
2. CŚ—calcium sulfate, $CaSO_4$
3. $CaF_2$—calcium fluoride D. "Substantially free of $C_3A$" means contains less than 1.0% of tricalcium aluminate.

A hybrid cement clinker of the ferrite-alite-calcium sulfoaluminate type, exhibiting enhanced performance and environmental characteristics, includes about 20-55 weight percent $C_3S$, about 5-25 weight percent $C_2S$, about 10-20 weight percent $C_4A_3\bar{S}$, and about 5-50 weight percent $C_4AF$, about 3-7 weight percent CŚ and about 0.5 to 1.0 weight percent $CaF_2$. Further, the hybrid cement clinker has a LAD modulus value of between about 0.8 and about 0.96, a RSA modulus value of between about 0.3 and about 4.0, a RSF modulus value of between about 0.2 and about 4.0, a SEC modulus value of between about 0.4 and about 2.3 and a QLP modulus value of between about 0.08 and about 0.12.

In another possible embodiment the hybrid cement clinker has a LAD modulus value of between about 0.86 and about 0.94, a RSA modulus value of between about 0.5 and about 2.5, a RSF modulus value of between about 0.3 and about 1.5, a SEC modulus value of between about 1.0 and about 1.7 and a QLP modulus value of between about 0.09 and about 0.11.

In yet another possible embodiment the hybrid cement clinker comprises about 35-41 or, more particularly about 35-36, weight percent $C_3S$, about 10-15 or, more particularly about 14-16, weight percent $C_2S$, about 14-16 or, more particularly about 15, weight percent $C_4A_3\bar{S}$, about 20-26 or, more particularly about 24-25, weight percent $C_4AF$ and about 4-6 or, more particularly about 5, weight percent CŚ and is fired at a temperature of about 1250-1300° C. The clinker has a LAD modulus value of between about 0.88 and about 0.92, a RSA modulus value of between about 1.0 and about 1.7, a RSF modulus value of between about 0.5 and about 0.8, a SEC modulus value of between about 1.0 and about 1.6 and a QLP modulus value of between about 0.095 and about 0.105.

In one possible embodiment of the invention the cement clinker incorporates stainless steel pickling sludge. This is a by-product of stainless steel production. In the process, the stainless steel is flooded with hydrofluoric acid (HF) which is used to clean the steel and remove contaminates like silica in the final product. The HF is neutralized with $CaCO_3$ which forms a $CaF_2$ rich sludge (P. Sludge in Table A). This material is non-hazardous but is typically not utilized and commands a disposal fee. The high content of calcium, fluoride and iron makes this material ideal for the production of the high ferrite-alite calcium sulfoaluminate cement (F/A-CSA). The $CaF_2$ contributes to the development of the fluorellestadite flux and the high iron to the formation of ferrite.

In another useful embodiment the cement clinker incorporates Bayer red mud. Red mud, along with brown mud, is a by-product of the Bayer process used to refine bauxite into alumina. This process uses sodium hydroxide to purify the alumina and produces an alkaline iron rich product in the form of a highly alkaline slurry. Although effort has been expended in finding uses for this material it is still considered a waste product. There are currently hundreds of millions of tons of red mud stored in facilities in North America many of which are on or near rivers and other ports. Red mud is very high in $Fe_2O_3$, $Al_2O_3$ and $TiO_2$ (Red Mud in Table A). Brown mud also has a high content of calcium. This material is of value for this application as it provides an important source of oxides critical to the formulation of the cement reducing the amount of bauxite in the formulation and thereby lowering clinker/cement production costs. In addition the utilization of red mud removes a long term environmental liability.

In another useful embodiment the cement clinker incorporates fluidized bed combustion spent bed material. Fluidized bed combustion (FBC) spent bed material is a by-product of the combustion of coal (CFB Ash in Table A). In this process coal is burned in the presence of limestone which reacts with the sulfur dioxide from the coal to form CaO and $CaSO_4$ (in the form of anhydrite). Also present are silicates from the coal ash. Although this is one of the cleanest technologies for coal combustion it has the decided disadvantage of producing up to four times more solid waste than conventional pulverized coal boilers, only a small fraction of which is utilized. This by-product is an important potential component in the formation of F/A CSA clinker, as it contributes both free lime, CaO and sulfate. The free lime contributes to the overall calcium needed in the formulation without adding carbonate, the sulfate is needed for the formation of the Klein's compound, as well as fluorellestadite.

In yet another useful embodiment, the cement clinker incorporates air cooled blast furnace slags. Much of the primary slag produced in a basic blast furnace is made cementitous and usable through rapid water quenching. This freezes the slag into a glass, which after, milling is hydraulically active and is referred to as ground granulated blast furnace slag or GGBFS. Many blast furnaces are not equipped with water quenching systems and the slags are air cooled. Air cooled slags are largely crystalline and are not, or only very weakly, hydraulically active. These materials can be used as aggregate but are more commonly disposed of.

Air cooled blast furnace slags may also be successfully used in the formulation of our F/A-CSA formulations. There inherent crystallinity did not interfere with the formation of the critical clinker compounds of the cement. These materials are plentiful and contribute CaO without $CO_2$ as well as reducing the cost of the materials.

In still another embodiment the cement clinker incorporates iron casting (Cupola) slags. Another category of slags that we have demonstrated to work well in the formulation of the cement clinker are cupola furnace slags from ductal and cast iron manufacturing (Iron Slag 1 and 2 in Table A). These slags are lower in iron but typically are as high in CaO and higher in $Al_2O_3$ content than blast furnace slags. These slags are generally produced at levels of tens of thousands of tons per year, compared to hundreds of thousands of tons for GGBFS materials. The lower quantity of production limits the capital investiture to make them hydraulic and like the air quenched blast furnace slags much of these potentially valuable materials is not utilized.

In still another possible embodiment, the cement clinker incorporates carbide lime. Carbide lime is a byproduct of acetylene manufacture. It is produced as a wet slurry and is typically dark in color due to its contamination with 1 to 2% carbon which limit its utilization to lower value applications. When dried, its chemistry (C. Lime in Table A) is very similar to that of conventional commercial hydrated lime (H. Lime in Table A). This material has been used in the formulation of F/A CSA and found to perform identically to conventional lime or limestone. It has the advantage of having very low carbonate concentration and its moisture content was found not to be a problem in formulating the clinker. Where available this is an ideal material for use in the formulation of F/A CSA. It has the advantage in increasing the flexibility of the composition of the other byproducts.

In still another possible embodiment, the cement clinker incorporates aluminum dross. Aluminum Dross is a by-product of aluminum production, and is generated at around 5 million tonnes each year. This waste material, black or white depending on the salt content, is disposed in landfill, which represents a potential environmental liability. Its high content of aluminum oxide is very advantageous as the use of this material would decrease the amount of expensive bauxite necessary for the formulation of high-iron cements, especially the calcium sulfoaluminate and ferrite clinker phases.

Of course, it should be appreciated that the cement clinker may incorporate any combination or even all of the waste materials including stainless steel pickling sludge, Bayer red mud, fluidized bed combustion spent bed material, air cooled blast furnace slags, iron casting slags, carbide lime, aluminum dross. A chemical composition of these industrial waste materials are set forth in the following Table 6.

prevents the formation of an iron oxide/hydroxide layer which covers the unreacted phases slowing or stopping the reaction. As a consequence, the ferrite is a fully reactive ettringite forming phase and the alite phase is also fully reactive producing C—S—H hydration products. The TIPA allows the cement paste to absorb more gypsum and then form more ettringite. The cement clinker may include between 0.05 to 1.0 weight percent of TIPA.

As should be appreciated the hybrid cement clinker may include high levels of ferrite (greater than 30% $C_4AF$) and lower levels of bauxite. In such a clinker, large amounts of red mud are used as a starting material. Red mud is inexpensive when compared to bauxite. Further, such a formulation employs a lower firing temperature thereby saving energy and

TABLE 6

Chemical composition of industrial by products used in F/A CSA formulations

| | CaO | $SiO_2$ | $Al_2O_3$ | $Fe_2O_3$ | $SO_3$ | LOI | MgO | $K_2O$ | $Na_2O$ | $P_2O_5$ | $TiO_2$ | F | Cr | Sum |
|---|---|---|---|---|---|---|---|---|---|---|---|---|---|---|
| H. Lime | 65.27 | 1.96 | 1.56 | 0.42 | 0.07 | 29.83 | 2.11 | 0.07 | 0.11 | 0.01 | 0.07 | — | — | 101.5 |
| C. Lime | 64.01 | 3.74 | 1.86 | 0.45 | 0.58 | 29.36 | 0.08 | 0.01 | 0.01 | — | — | — | — | 100.1 |
| CFB Ash | 45.91 | 15.3 | 5.95 | 3.44 | 23.1 | 4.61 | 1.99 | 0.47 | 0.11 | 0.11 | 0.3 | — | — | 101.3 |
| Red Mud | 6.96 | 9.41 | 15.33 | 46.5 | 0.44 | 12.81 | 0.45 | 0.18 | 1.59 | 0.74 | 5.7 | — | — | 100.1 |
| Bauxite | 0.16 | 6.64 | 58.54 | 6.28 | 0.24 | 27.6 | 0.2 | 0.01 | 0.01 | 0.22 | 2.18 | — | — | 102.1 |
| BFSFines | 38.34 | 37.03 | 10.25 | 1.13 | 0.8 | 0.54 | 10.99 | 0.39 | 0.3 | 0.01 | 0.49 | — | — | 100.3 |
| Iron Slag1 | 30.21 | 50.71 | 12.84 | 1.35 | 0.21 | 0 | 3.71 | 0.33 | 0.49 | 0.01 | 0.43 | — | — | 100.3 |
| Iron Slag2 | 36.96 | 46.94 | 8.56 | 1.56 | 0.67 | 0 | 1.47 | 0.38 | 0.06 | 0.02 | 0.36 | — | — | 97.00 |
| P. Sludge | 51.24 | 3.51 | 0.87 | 15.45 | 7.57 | 0 | 1.11 | 0.02 | 0.24 | 0.04 | 0.15 | 16.1 | 1.5 | 97.7 |
| Al Dross | 0.88 | 4.41 | 64.45 | 2.63 | 0 | 20.02 | 3.85 | 1.20 | 0.67 | 0.07 | 0.23 | — | — | 98.55 |
| C Fly Ash | 26.28 | 35.24 | 20.47 | 5.13 | 1.83 | 0.38 | 5.04 | 0.46 | 1.47 | 1.43 | 1.24 | — | — | 99.0 |

Seven different formulations of cement clinker made using these waste materials with modulus values and clinker compositions as identified above are set forth in Table 7.

lowering production costs. Lower $CO_2$ emissions are also produced as compared to ordinary portland cement. Cement clinkers rich in ferrite also require large amounts of gypsum.

TABLE 7

Formulation of cement from a variety of industrial by products

| Formulations # | 1 | 2 | 3 | 4 | 5 | 6 | 7 |
|---|---|---|---|---|---|---|---|
| Modulus Values | | | | | | | |
| LAD | 0.88 | 0.88 | 0.88 | 0.88 | 0.88 | 0.88 | 0.88 |
| RSA | 1.32 | 1.32 | 1.32 | 1.32 | 1.25 | 1.29 | 1.3 |
| RSF | 0.61 | 0.61 | 0.61 | 0.61 | 0.61 | 0.62 | 0.61 |
| SEC | 1.2 | 1.2 | 1.2 | 1.2 | 1.2 | 1.2 | 1.2 |
| QLP | 0.1 | 0.1 | 0.1 | 0.1 | 0.1 | 0.1 | 0.1 |
| Composition of By Products | | | | | | | |
| Fluidized Bed Bottom Ash | 13.86 | 13.62 | 0 | 13.39 | 15.35 | 14.2 | 13.9 |
| Red Mud | 9 | 9 | 9.5 | 8.61 | 11.7 | 9.8 | 9.71 |
| Bauxite | 7.6 | 8.5 | 7.6 | 6.3 | 7 | 0 | 0 |
| Iron Slag #1 | 0 | 13.5 | 0 | 0 | 0 | 0 | 13.6 |
| Iron Slag #2 | 12.4 | 0 | 15.4 | 7.68 | 0 | 12.19 | 0 |
| Blastfurnace Slag | 0 | 0 | 0 | 0 | 10.13 | 0 | 0 |
| Class C Fly Ash | 0 | 0 | 0 | 7.15 | 8.87 | 0 | 0 |
| TOTAL | 100 | 100 | 100 | 100 | 100 | 100 | 100 |
| Clinker Compositions | | | | | | | |
| C3S | 36 | 36 | 36 | 36 | 35 | 36 | 36 |
| C2S | 16 | 16 | 15 | 15 | 15 | 14 | 15 |
| $C_4A_3\bar{S}$ | 15 | 15 | 15 | 15 | 15 | 15 | 15 |
| C4AF | 24 | 24 | 24 | 24 | 25 | 24 | 24 |
| C$\bar{S}$ | 5 | 5 | 5 | 5 | 5 | 5 | 5 |

In any of the current formulations of cement clinker, TIPA may be added to accelerate or assist the reaction of ferrite to form ettringite which helps to form a harder more stable cement paste. The hypothesis is that TIPA assists the hydration processes by reacting with the ferric iron from ferrite phase allowing an iron rich ettringite to be formed. This also For example a cement clinker formulation incorporating 45% $C_4AF$ comprises approximately 30% gypsum and 70% clinker as compared to ordinary Portland cement which typically comprises about 95% clinker and 5% gypsum. Table 8 below illustrates potential energy savings of the current cement clinker formulations.

TABLE 8

|  | Limestone needed (kg/ t clinker) - Compared to OPC | CO2-emission from raw materials (kg/ t clinker) - Compared to OPC | Theoretical amount of gypsum needed (kg/t cement) | CO2-emission from raw materials (kg/ t cement) - Compared to OPC |
|---|---|---|---|---|
| #1-BP | 675-43.8% | 466-11.7% | 6 | 438-16.6% |
| #2-BP | 687-42.8% | 441-16.5% | 13 | 384-26.9% |
| #3-BP | 700-41.7% | 417-21.0% | 20 | 334-36.5% |
| #4-BP | 713-40.6% | 396-25.0% | 27 | 289-45.0% |
| #5-BP | 725-39.6% | 379-28.2% | 33 | 262-50.1% |
| OPC | 1200 | 528 | 5 | 525 |

OPC values above taken from Gartner patent for comparison with our compositons

In one particularly useful embodiment the cement clinker formulation is substantially free of $C_3A$. The lack of $C_3A$ (along with low free lime) indicates that the proper firing regime, i.e. time and temperature, has been achieved. High free lime (i.e. greater than 1%) indicates that the clinker is not fully reacted and high $C_3A$ indicates that the clinker has been "over-fired" and the Klein's compound has begun to decompose. In the cement itself if unregulated (i.e. under-sulfated), $C_3A$ can induce flash set during hydration and result in cracking. In another particularly useful embodiment the cement clinker includes between 675-725 kg of limestone per ton of clinker.

The cement clinker and a cement incorporating a cement clinker may be made in accordance with the following general method. Typically the cement includes between about 65 and about 95 weight percent clinker and between about 5 and about 35 weight percent gypsum. In one useful embodiment the cement includes between about 78 and about 82 weight percent clinker and between about 18 and about 22 weight percent gypsum.

Step 1: Many byproducts are already fine in nature for those that are not they must be ground finely to reach a small particle size, this may vary but finer is better, with sizes as small as ~15 um desirable.

Step 2: Mix all the raw materials until the materials are intimately associated.

Step 3: Fire the mixture in a rotary kiln pellets following the correct firing regime for each composition:
Room Temperature up to 800° C. for 30 minutes, followed by up to 1250/1275/1300° C. for 60 minutes.

Step 4: Quench the pellets formed in air.

Step 5: Grind the pellets to a particle size close to 15 µm.

Step 6: Grind the clinker with the appropriate amount of gypsum to optimize the clinker properties, which depends on the clinker composition and the theoretical amount of gypsum required to completely hydrate $C_4A_3\bar{S}$ and $C_4AF$ clinker phases.

This process is identical for any kind of raw materials used.

The following examples are provided to further illustrate the novel cement clinker but it is not to be considered as limited thereto.

Example 1

This example illustrates the feasibility to produce a clinker comprising 36% $C_3S$, 14% $C_2S$, 15% $C_4A_3\bar{S}$, 24% $C_4AF$ and 5% $C\bar{S}$, with modulus values of 0.88 for LAD, 1.28 for RSA, 0.60 for RSF, 1.20 for SEC and 0.10 for QLP from exclusively industrial by-products. Using the procedures describe above limestone, FGD gypsum, aluminum dross, pickling sludge, red mud, and an iron slag in the proportions in Table 9 are blended together and fired in a rotary kiln to form a clinker.

TABLE 9

Other examples of industrial byproduct usage.

| Raw Materials | | Clinker Phases | | Moduli | |
|---|---|---|---|---|---|
| $CaCO_3$ | 56.6 | $C_3S$ | 36 | LAD | 0.88 |
| FGD Gypsum | 6.72 | $C_2S$ | 14 | RSA | 1.28 |
| Aluminum Dross | 7.9 | $C_4A_3\bar{S}$ | 15 | RSF | 0.60 |
| Pickling Sludge | 1.6 | $C_4AF$ | 24 | SEC | 1.20 |
| Red Mud | 10.4 | $C\bar{S}$ | 5 | QLP | 0.10 |
| Iron Slag #1 | 16.78 | | | | |

Example 2

This example describes the fabrication of a similar clinker to example 1, using the procedures described above. Limestone, fluidized bed bottom ash, bauxite, fluorite, red mud, iron slag #2, and class C fly ash in the proportions described in Table 10 are mixed and fired in a rotary kiln to form a clinker.

TABLE 10

Other examples of industrial byproduct usage.

| Raw Materials | | Clinker Phases | | Moduli | |
|---|---|---|---|---|---|
| $CaCO_3$ | 55.16 | $C_3S$ | 36 | LAD | 0.88 |
| Fluidized Bed Bottom Ash | 13.715 | $C_2S$ | 14 | RSA | 1.28 |
| Bauxite | 5.7 | $C_4A_3\bar{S}$ | 15 | RSF | 0.60 |
| Fluorite | 0.575 | $C_4AF$ | 24 | SEC | 1.20 |
| Red Mud | 9.25 | $C\bar{S}$ | 5 | QLP | 0.10 |
| Iron Slag #2 | 5.3 | | | | |
| Class C Fly Ash | 10.3 | | | | |

Example 3

This example describes the fabrication of a similar clinker to examples 1 and 2, with different by-products as raw materials. Using the procedures described above carbide lime, FGD Gypsum, aluminum dross, pickling sludge, red mud, blastfurnace slag, and Class C fly ash in the proportions of Table 11 are fired in a rotary kiln to form a clinker.

TABLE 11

Other examples of industrial byproduct usage.

| Raw Materials | | Clinker Phases | | Moduli | |
|---|---|---|---|---|---|
| $Ca(OH)_2$ | 49.4 | $C_3S$ | 36 | LAD | 0.88 |
| FGD Gypsum | 7.0 | $C_2S$ | 14 | RSA | 1.28 |
| Aluminum Dross | 5.3 | $C_4A_3\bar{S}$ | 15 | RSF | 0.60 |
| Pickling Sludge | 1.8 | $C_4AF$ | 24 | SEC | 1.20 |
| Red Mud | 10.6 | $C\bar{S}$ | 5 | QLP | 0.10 |
| Blastfurnace slag | 11.0 | | | | |
| Class C fly ash | 14.9 | | | | |

Example 4

This example describes the fabrication of a high iron—high ferrite containing clinker. Using the procedures described above carbide lime, FGD Gypsum, aluminum dross, pickling sludge, red mud, and Class C fly ash in the proportions indicated in Table 12 are mixed and fired in a rotary kiln to form a clinker.

TABLE 12

Other examples of industrial byproduct usage.

| Raw Materials | | Clinker Phases | | Moduli | |
|---|---|---|---|---|---|
| Ca(OH)$_2$ | 47.26 | C$_3$S | 22 | LAD | 0.90 |
| FGD Gypsum | 10.0 | C$_2$S | 7 | RSA | 0.49 |
| Aluminum Dross | 13.5 | C$_4$A$_3$$\bar{S}$ | 19 | RSF | 0.50 |
| Pickling Sludge | 1.74 | C$_4$AF | 39 | SEC | 1.55 |
| Red Mud | 19 | C$\bar{S}$ | 6 | QLP | 0.10 |
| Class C fly ash | 8.5 | | | | |

Example 5

This example describes the fabrication of a clinker high in alite. Using the procedures described above carbide lime, FGD Gypsum, pickling sludge, red mud, and Class C fly ash, in the proportions of Table 13, are mixed and fired in a rotary kiln to form a clinker.

TABLE 13

Other examples of industrial byproduct usage.

| Raw Materials | | Clinker Phases | | Moduli | |
|---|---|---|---|---|---|
| Ca(OH)$_2$ | 52.95 | C$_3$S | 50 | LAD | 0.95 |
| FGD Gypsum | 8.5 | C$_2$S | 7 | RSA | 1.94 |
| Class C fly ash | 31.75 | C$_4$A$_3$$\bar{S}$ | 13 | RSF | 0.77 |
| Pickling Sludge | 1.8 | C$_4$AF | 17 | SEC | 1.98 |
| Red Mud | 5 | C$\bar{S}$ | 7 | QLP | 0.10 |

Example 6

This example illustrates the influence of the firing regime, more specifically the firing temperature and dwell time, on the free lime content of the formulations of Table 3, which contain different contents of ferrite. Less than 1% free lime is considered to be indicative of proper clinker formation, The "+" sign alongside the free lime content in Table 14 indicates the tricalcium aluminate (from XRD analyzes) is clearly present in the sample. A high firing temperature leads to the formation of tricalcium aluminate, which indicates that the C$_4$A$_3$$\bar{S}$ phase is decomposing. It is illustrated that high iron and ferrite content contribute to the decrease in kiln temperature needed for clinker formation.

TABLE 14

Free lime as a function of firing regime.

| Firing regime | #1 | #2 | #3 | #4 | #5 |
|---|---|---|---|---|---|
| 1250° C.-60 min | — | 1.85 | 1.14 | 1.38 | 1.20 |
| 1275° C.-30 min | — | 1.62 | 1.26 | 0.90 | 1.02 |
| 1275° C.-60 min | — | 0.72 | 0.60 | 0.54 | 0.66 |
| 1300° C.-30 min | 1.50 | 0.30 (+) | 0.24 (+) | 0.30 (+) | 0.30 (+) |

TABLE 14-continued

Free lime as a function of firing regime.

| Firing regime | #1 | #2 | #3 | #4 | #5 |
|---|---|---|---|---|---|
| 1300° C.-60 min | 0.78 | — | — | — | — |
| 1325° C.-30 min | 1.79 | — | — | — | — |
| 1325° C.-60 min | 0.60 | — | — | — | — |
| 1350° C.-60 min | 1.08 (+) | — | — | — | — |

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A cement clinker, comprising:
   about 35-41 weight percent C$_3$S;
   about 10-15 weight percent C$_2$S;
   about 14-16 weight percent C$_4$A$_3$$\bar{S}$;
   about 20-26 weight percent C$_4$AF;
   about 4-6 weight percent C$\bar{S}$; and
   about 0.7-0.85 weight percent CaF$_2$;
   fired at a temperature of about 1250-1300° C.

2. The clinker of claim 1 having a lime adequate degree (LAD) modulus value of between 0.88 and 0.92, a ratio of silicates and aluminates (RSA) modulus value of between 1.0 and 1.7, a ratio of sulfoaluminates and ferroaluminates (RSF) modulus value of between 0.5 and 0.8, a sulfur excessive coefficient (SEC) modulus value of between 1.0 and 1.6 and a quantity of liquid phase (QLP) modulus value of between 0.095 and 0.105.

3. The cement clinker of claim 1 incorporating stainless steel pickling sludge.

4. The cement clinker of claim 1 incorporating Bayer red mud.

5. The cement clinker of claim 1 incorporating fluidized bed combustion spent bed material.

6. The cement clinker of claim 1 incorporating air cooler blast furnace slag.

7. The cement clinker of claim 1 incorporating iron casting slag.

8. The cement clinker of claim 1 incorporating carbide lime.

9. The cement clinker of claim 1 incorporating aluminum dross.

10. The cement clinker of claim 1, incorporating between 0.2 and 1.0 weight percent of TIPA.

11. The cement clinker of claim 1, wherein said clinker is substantially free of C$_3$A.

12. The cement clinker of claim 1, incorporating between 675-725 kg of limestone per ton of clinker.

13. The cement clinker of claim 1, incorporating between 0.05 and 1.0 weight percent of TIPA.

* * * * *